United States Patent
Barijough

(10) Patent No.: US 10,497,068 B2
(45) Date of Patent: Dec. 3, 2019

(54) ADVICE ENGINE SYSTEMS

(71) Applicant: FUJITSU LIMITED, Kawasaki-shi, Kanagawa (JP)

(72) Inventor: Sanam Mirzazad Barijough, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 165 days.

(21) Appl. No.: 15/268,562

(22) Filed: Sep. 17, 2016

(65) Prior Publication Data
US 2018/0081892 A1    Mar. 22, 2018

(51) Int. Cl.
*G06Q 50/00* (2012.01)
*G06Q 10/10* (2012.01)

(52) U.S. Cl.
CPC ............. *G06Q 50/01* (2013.01); *G06Q 10/10* (2013.01)

(58) Field of Classification Search
CPC ........... G06F 17/3097; G06F 17/30979; G06F 17/30991; G06Q 50/01; G06Q 10/10
USPC .................. 707/723, 730, 732, 736
See application file for complete search history.

(56) References Cited

U.S. PATENT DOCUMENTS

| | | |
|---|---|---|
| 6,009,420 A | 12/1999 | Fagg, III et al. |
| 7,783,545 B2 | 8/2010 | Sloan et al. |
| 7,958,066 B2 | 6/2011 | Pinckney et al. |
| 2008/0059576 A1* | 3/2008 | Liu ........................ G06Q 10/10 709/204 |
| 2009/0112837 A1* | 4/2009 | Modani ............. G06F 17/30705 |
| 2009/0150387 A1* | 6/2009 | Marchewitz ...... G06F 17/30864 |
| 2010/0036697 A1* | 2/2010 | Kelnar ................. G06Q 10/063 705/7.11 |

OTHER PUBLICATIONS

Sears, Evan, "Most Efficient Alternative-Fuel Vehicles 2016," cars.com, Feb. 8, 2016. Retrieved from <http://www.cars.com/go/advice/Story.jsp?section=fuel&subject=quizzes&story=qGasHybrid&referer=advice&aff=national>.

* cited by examiner

*Primary Examiner* — Hares Jami
(74) *Attorney, Agent, or Firm* — Maschoff Brennan

(57) ABSTRACT

A method of providing advice to a user may be provided. A method may include receiving a topic from the user. The method may also include presenting one or more potential advice conversations to a human professional, wherein each potential advice conversation of the one or more potential advice conversations includes one or more advice statements. Further, the method may include selecting an advice statement from the one or more advice statements, and presenting the selected advice statement to the user upon receiving approval of the selected advice statement from the human professional.

20 Claims, 15 Drawing Sheets

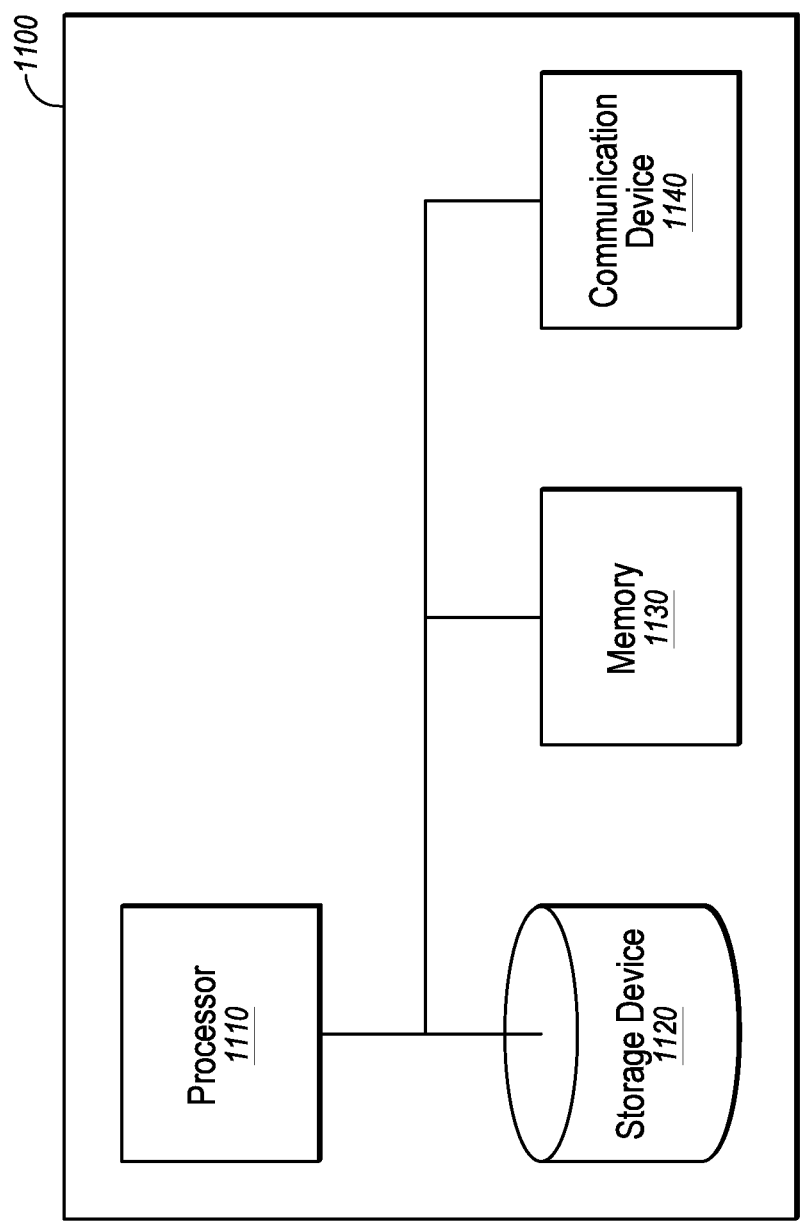

ADVICE ENGINE SYSTEMS

FIELD

The embodiments discussed herein relate to advice engine systems and, more specifically, to systems including an advice engine configured to interact with a supervising human professional for providing advice to a user.

BACKGROUND

Advice engines may provide advice, such as financial planning advice, health advice, family advice, etc., to users. More specifically, advice engines may assist a user in completing a task and/or making a decision (e.g., deciding what type of car to purchase) via providing one or more suggestions to the user.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a method of providing advice. The method may include receiving a topic from a user. The method may further include presenting one or more potential advice conversations related to the topic to a human professional, wherein each potential advice conversation of the one or more potential advice conversations includes one or more advice statements. In addition, the method may include selecting an advice statement from the one or more advice statements and presenting the selected advice statement to the user upon receiving approval of the advice statement from the professional.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which:

FIG. 11 is a block diagram of an example computing device.

DESCRIPTION OF EMBODIMENTS

Various embodiments disclosed herein relate to advice engine systems configured to provide efficient and human-like advice to users. The advice engine system, which may include an advice engine and a human (e.g., professional and/or expert) may provide advice via one or more advice conversations (e.g., tree form advice conversations).

More specifically, according to various embodiments, an advice engine may be semi-supervised by a human professional, who may edit and/or add one or more advice conversations dynamically to a conversation tree (e.g., to improve the quality of content). Depending on the context, a human professional, who may support multiple advice conversations at the same time, may provide more efficient advice compared to a machine (e.g., an advice engine).

According to some embodiments, advice may include a recommendation given as a guide toward reaching a goal. For example, advice may be provided for various subjects and/or issues, such as issues that users may face in everyday life and/or issues where users may trust the opinion of the crowd (e.g., best bank to get a loan). Further, advice may be provided as a recommendation to a user to help the user reach a goal (e.g., losing weight).

In some embodiments, application of an advice engine system may be restricted to cases wherein the scope of the advice being sought is not dramatically unbound. For example, a subject such as "how can I break the cycle of poverty in the world?" may not be covered. Further, a question such as "what is life?" may not be covered since the question does not seek a recommendation.

Embodiments of the present disclosure are now explained with reference to the accompanying drawings.

Figure 1:
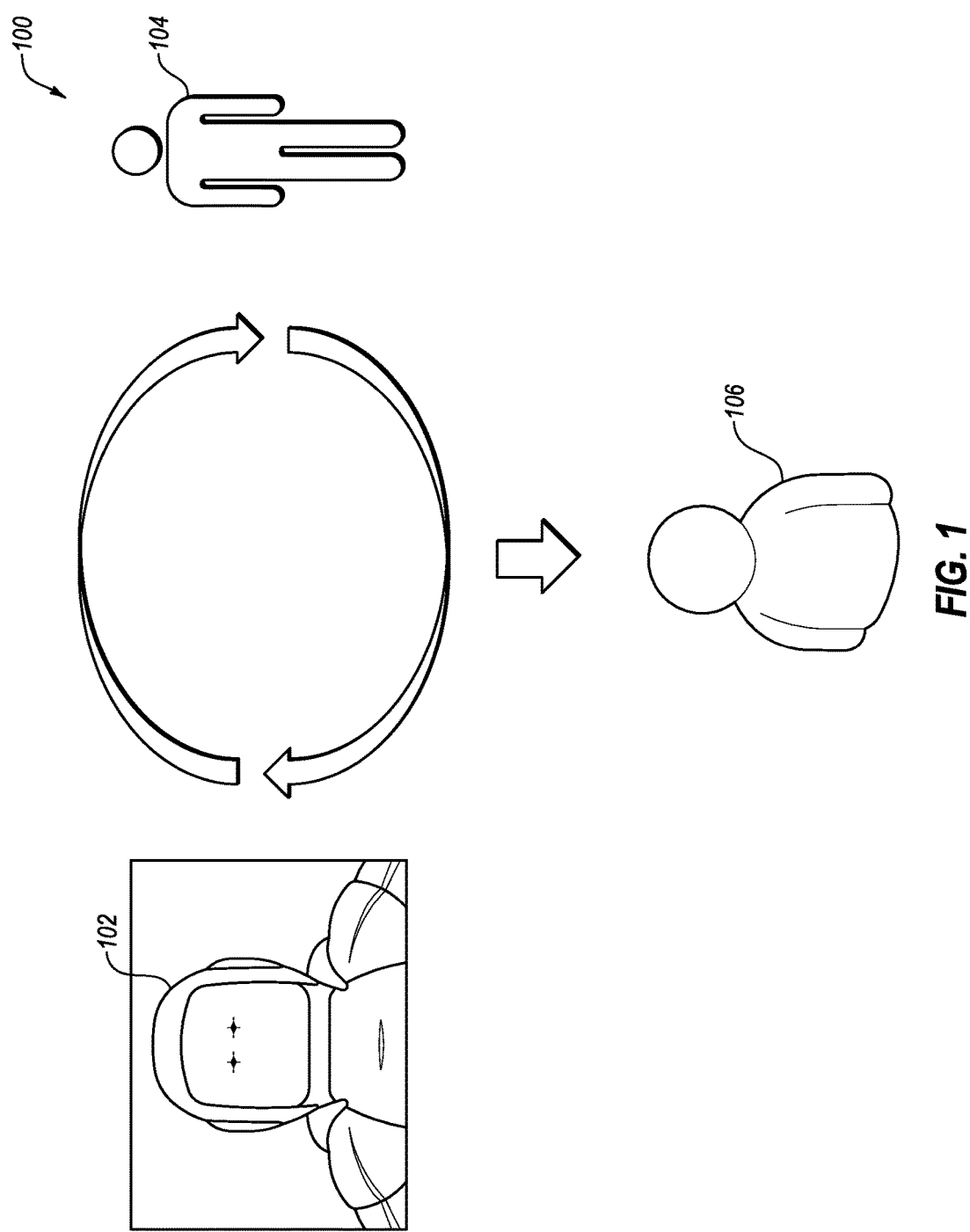
FIG. 1 illustrates an example system including an advice engine and a human professional.

FIG. 1 depicts a system 100 including an advice engine 102, a human 104, and a user 106. For example, human 104 may include a professional and/or an expert for one or more topics. It is noted that "human 104" may also be referred to herein as a "professional 104," "human professional 104," "expert 104," or any combination thereof.

Figure 2:
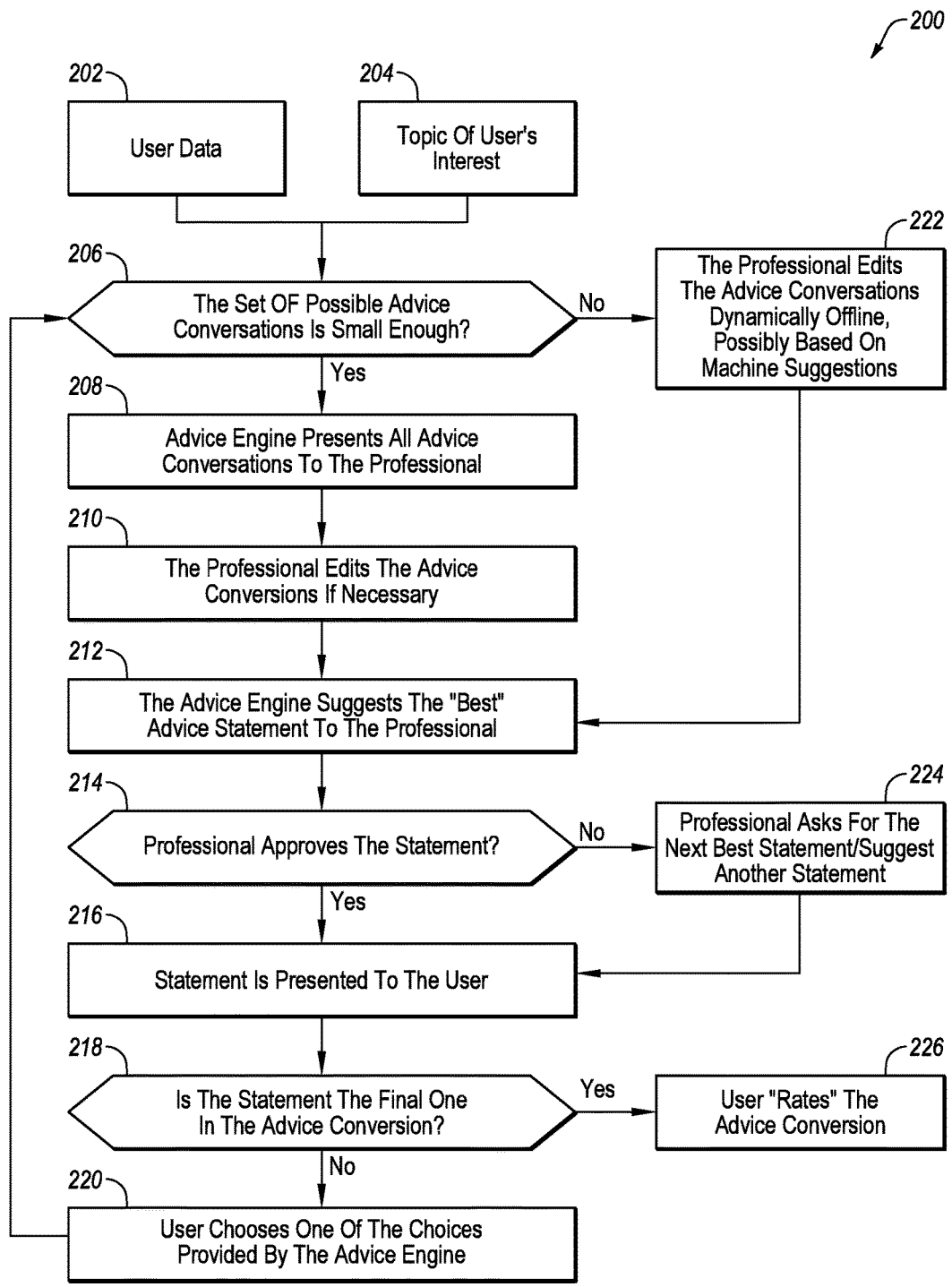
FIG. 2 is a diagram of an example flow that may be used to operate an advice engine system.

FIG. 2 is a diagram of an example flow 200 that may be used in operating an advice engine system, in accordance with at least one embodiment of the present disclosure. Flow 200 may be performed by any suitable system, apparatus, or device. For example, system 100 of FIG. 1 or one or more of the components thereof may perform one or more of the operations associated with flow 200. In these and other embodiments, program instructions stored on a computer readable medium may be executed to perform one or more of the operations of flow 200. Flow 200 will now be described with reference to FIGS. 1 and 2.

At block 206, based on user data 202 and a topic 204 (e.g., as selected by user 106), a determination may be made as to whether a set of all possible advice conversations is sufficiently limited. Stated another way, a determination as to whether a number of possible advice conversations is less than a threshold value. A threshold value may be a function of the capability of the professional (e.g., human 104) and the size of the advice conversations. For example, if a maximum number of advice conversation that a professional is able to revise is Y (e.g., 60). Then, the threshold value may be determined by multiplying Y by a value X, wherein $0<X<1$. The larger the size of the advice conversations, the smaller the value of X. Further, user data 202, which may be received from a user (e.g., user 106), may include any data specific to the user, such as data related to the user's location, education, age, sex, income, etc.

With reference again to block 206, if a set of all possible advice conversations set is sufficiently limited, flow 200 may proceed to block 208. If the set of all possible advice conversations set is not sufficiently limited, flow 200 may proceed to block 222.

At block 208, advice engine 102 may present one or more possible advice conversations to professional 104, and flow 200 may proceed to block 210. At block 210, professional 104 may edit the advice conversions if necessary, and flow 200 may proceed to block 212.

At block 212, advice engine 102 may suggest an advice statement, which is best matched for user 106, to professional 104, and flow may proceed to block 214. In one embodiment, advice engine 102 may suggest the advice statement to professional 104 before presenting the advice statement to user 106.

At block 214, a determination may be made as to whether professional 104 confirms the suggested advice statement to be presented to user 106. If professional 104 confirms the suggested advice statement, flow 200 may proceed to block 216. If professional 104 does not confirm the suggested advice statement, flow 200 may proceed to block 224, which is further explained below. At block 216, the advice statement may then be presented to user 106, and flow 200 may proceed to block 218.

At block 218, a determination may be made as to whether the advice statement is the final advice statement in the advice conversation. If the advice statement is the final advice statement in the advice conversation, flow 200 may proceed to block 226, which is further explained below. If the advice statement is not the final advice statement in the advice conversation, flow 200 may proceed to block 220.

At block 220, user 106 may select one of the choices provided by advice engine 102 as the answer to a question presented by the advice statement, and flow 200 may return to block 206. It is noted that each advice conversation includes an advice statement, which may further spawn one or more additional advice conversations, each generating, yet, one or more advice statements that further spawn one or more advice conversations, and so on.

At block 222, professional 104 may edit the advice conversations (e.g., offline), and flow 200 may proceed to block 212. More specifically, for example, based on suggestions provided by advice engine 102, professional 104 may dynamically edit the advice conversations.

At block 224, professional 104 may request another (e.g., the next best) advice statement and/or suggest another advice statement (e.g., added or chosen from the already existing advice statements), and flow 200 may proceed to block 216. According to one embodiment, professional 104 may continue to request another (e.g., the next best) advice statement until professional 104 is satisfied with an advice statement. In another embodiment, if professional 104, after receiving a definable number of advice statements (e.g., 2, 3, or 4), is still unsatisfied with the suggested advice statement, professional 104 may suggest an advice statement.

At block 226, user 106 may rate the advice conversation, as described more fully below.

Modifications, additions, or omissions may be made to the flow 200 without departing from the scope of the present disclosure. For example, the operations of flow 200 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments. In short, flow 200 is merely one example of operating an advice engine system and the present disclosure is not limited to such.

Figure 3:
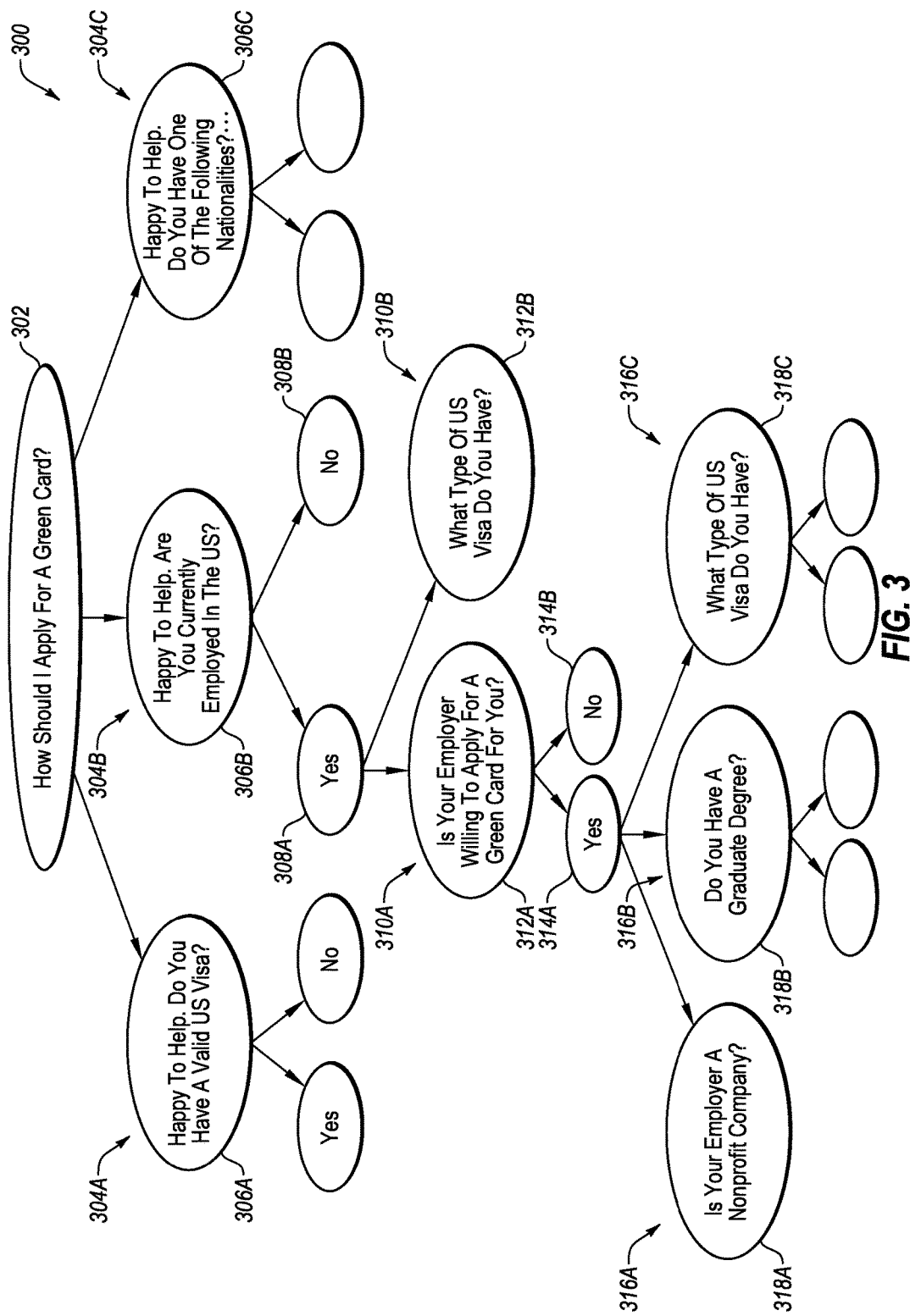
FIG. 3 depicts an example conversation tree.

FIG. 3 illustrates an example advice conversation tree 300. Advice conversation tree 300 will now be described with reference to FIGS. 1 and 3. Advice conversation 300, which may illustrate a practical application of flow 200 of FIG. 2, includes a topic 302 of "How should I apply for a green card?" (e.g., block 204, FIG. 2). Topic 302 may be provided by user 106 (e.g., block 204, FIG. 2).

It may be determined whether a set of all possible advice conversations originating from topic 302 is sufficiently limited in size (e.g., small enough) (e.g., block 206, FIG. 2). Advice conversation tree 300 further includes advice conversations 304A, 304B, and 304C, each of which including one or more conversation paths. As noted above, advice conversations 304A, 304B, and 304C may be presented to professional 104 (e.g., block 208, FIG. 2).

Each advice conversation 304A, 304B, and 304C includes an advice statement 306. Advice engine 102 may suggest an advice statement (advice statement 306B in this example) to professional 104 (e.g., block 212, FIG. 2). In this example, advice statement 306B is approved by professional 104 and presented to user 106 (e.g., block 216, FIG. 2). User 106 may select either response 308A or response 308B. In this example, user 106 selected response 308A.

Based on the selection by user 106, it may be determined whether a set of all possible advice conversations is sufficiently limited in size (e.g., small enough), and advice conversations 310A and 310B may be presented to professional 104. Each advice conversation 310A and 310B includes an advice statement 312. Advice engine 102 may suggest an advice statement (advice statement 312A in this example) to professional 104. In this example, advice statement 312A is approved by professional 104 and presented to user 106. User 106 may select either response 314A or response 314B. In this example, user 106 selected choice 314A.

Based on the selection by user 106, it may be determined whether a set of all possible advice conversations is sufficiently limited in size (e.g., small enough), and advice conversations 316A and 316B may be presented to professional 104. Each advice conversation 316A and 316B includes an advice statement 318. Advice engine 102 may suggest an advice statement (advice statement 318B in this example) to professional 104. Further, in this example, professional 104 edits conversation tree 300 by adding an additional advice statement 316C including advice statement 318C.

Figure 4:
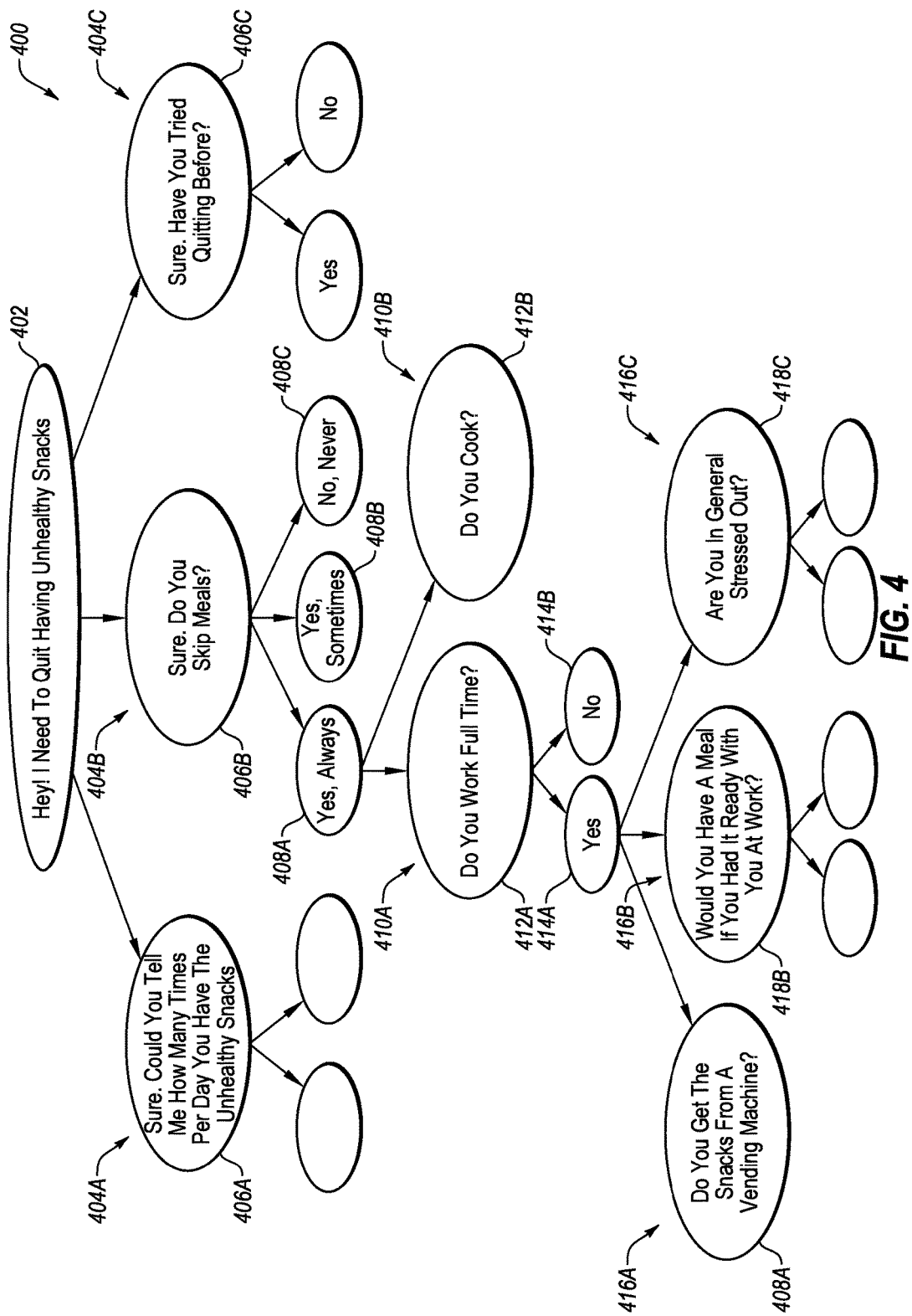
FIG. 4 depicts another example conversation tree.

FIG. 4 illustrates another example advice conversation tree 400. Advice conversation tree 400 will now be described with reference to FIGS. 1 and 4. Advice conversation 400 includes a topic 402 of "Hey! I need help to quit having unhealthy snacks". Topic 402 may be provided by user 106.

It may be determined whether a set of all possible advice conversations originating from topic 402 is sufficiently limited in size (e.g., small enough). Advice conversation tree 400 further includes advice conversations 404A, 404B, and 404C, each of which including one or more conversation paths. As noted above, advice conversations 404A, 404B, and 404C may be presented to professional 104.

Each advice conversation 404A, 404B, and 404C includes an advice statement 406. Advice engine 102 may suggest an advice statement (advice statement 406B in this example) to professional 104. In this example, advice statement 406B is approved by professional 104 and presented to user 106. User 106 may select either response 408A, response 408B, or response 408C. In this example, user 106 selected response 408A.

Based on the selection by user 106, it may be determined whether a set of all possible advice conversations is sufficiently limited in size (e.g., small enough), and advice conversations 410A and 410B may be presented to professional 104. Each advice conversation 410A and 410B includes an advice statement 412. Advice engine 102 may suggest an advice statement (advice statement 412A in this example) to professional 104. In this example, advice statement 412A is approved by professional 104 and presented to user 106. User 106 may select either response 414A or response 414B. In this example, user 106 selected response 414A.

Based on the selection by user 106, it may be determined whether a set of all possible advice conversations is sufficiently limited in size (e.g., small enough), and advice conversations 416A and 416B may be presented to professional 104. Each advice conversation 416A and 416B includes an advice statement 418. Advice engine 102 may suggest an advice statement (advice statement 418B in this example) to professional 104. Further, in this example, professional 104 edits conversation tree 400 by adding an additional advice conversation 416C including advice statement 418C.

Figure 5:
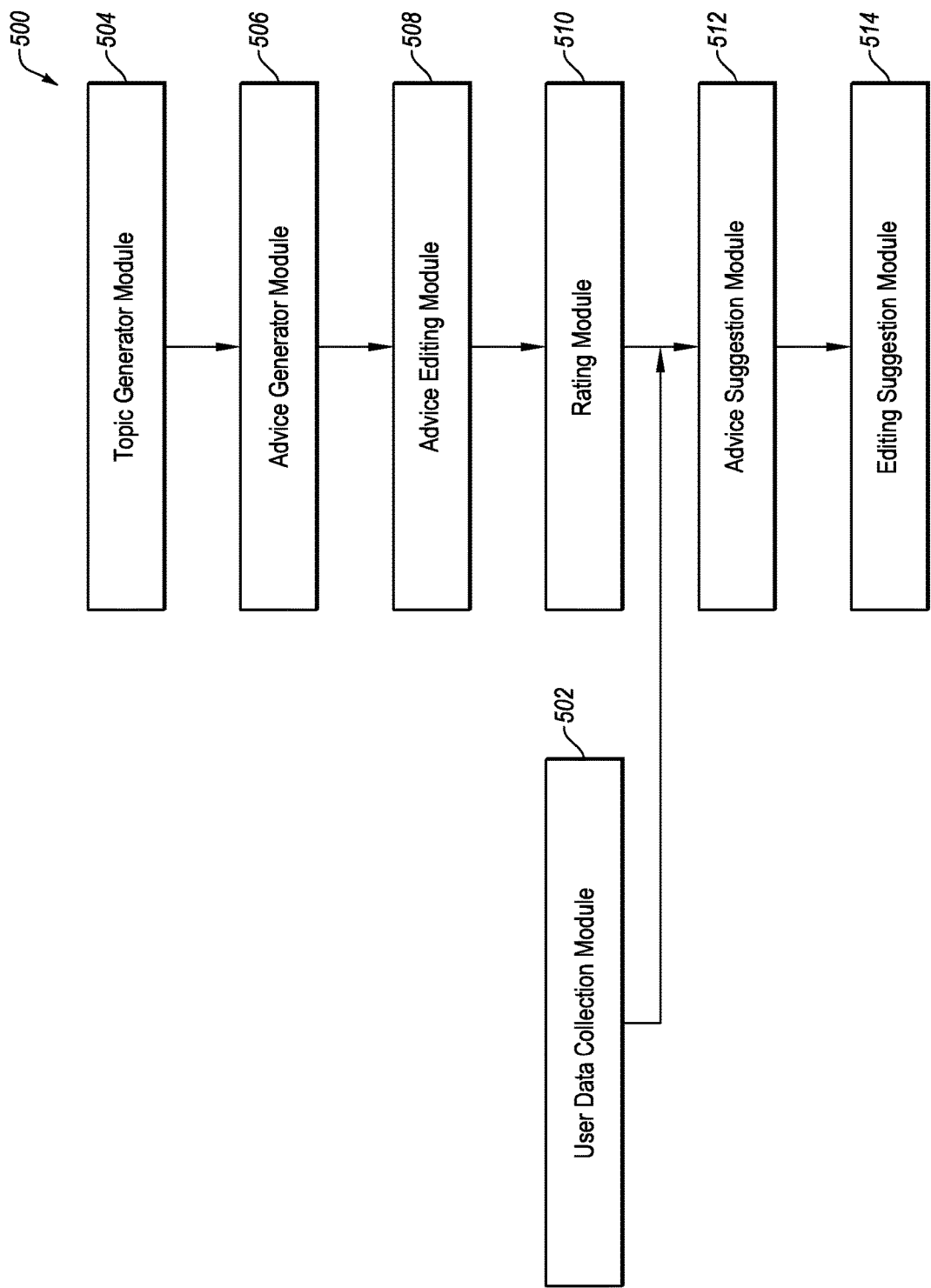
FIG. 5 illustrates an example system including various modules of an example advice engine system.

FIG. 5 depicts a system 500 including various modules. More specifically, system 500 includes a user data collection module 502, a topic generator module 504, an advice generator module 506, an advice editing module 508, a rating module 510, an advice suggestion module 512, and an editing suggestion module 514. It is noted that system 500 is not limited to the specific configuration shown in FIG. 5. Rather, any module may be coupled to any other module, either directly or indirectly (e.g., via another module).

Depending on a topic, a user (e.g., user 106 of FIG. 1) may provide data, such as age, geographic location, income, etc., to user data collection module 502.

In some embodiments in which users may trust reviews from a relatively large number of people, topic generator module 504 may, for example, use data (e.g., crowdsourced data) to generate advice topics. For example, topics, such as financial topics (e.g., advice on buying a car, advice on banks to get a loan, etc.), family-related topics (e.g., choosing a pet, shopping, etc.), travel topics (e.g., vacation spots, how to deal with online travel websites, etc.), work and/or educational topics (e.g., how to deal with a coworker), may be considered topics wherein topic generator module 504 may use crowdsourced data.

Figure 6:
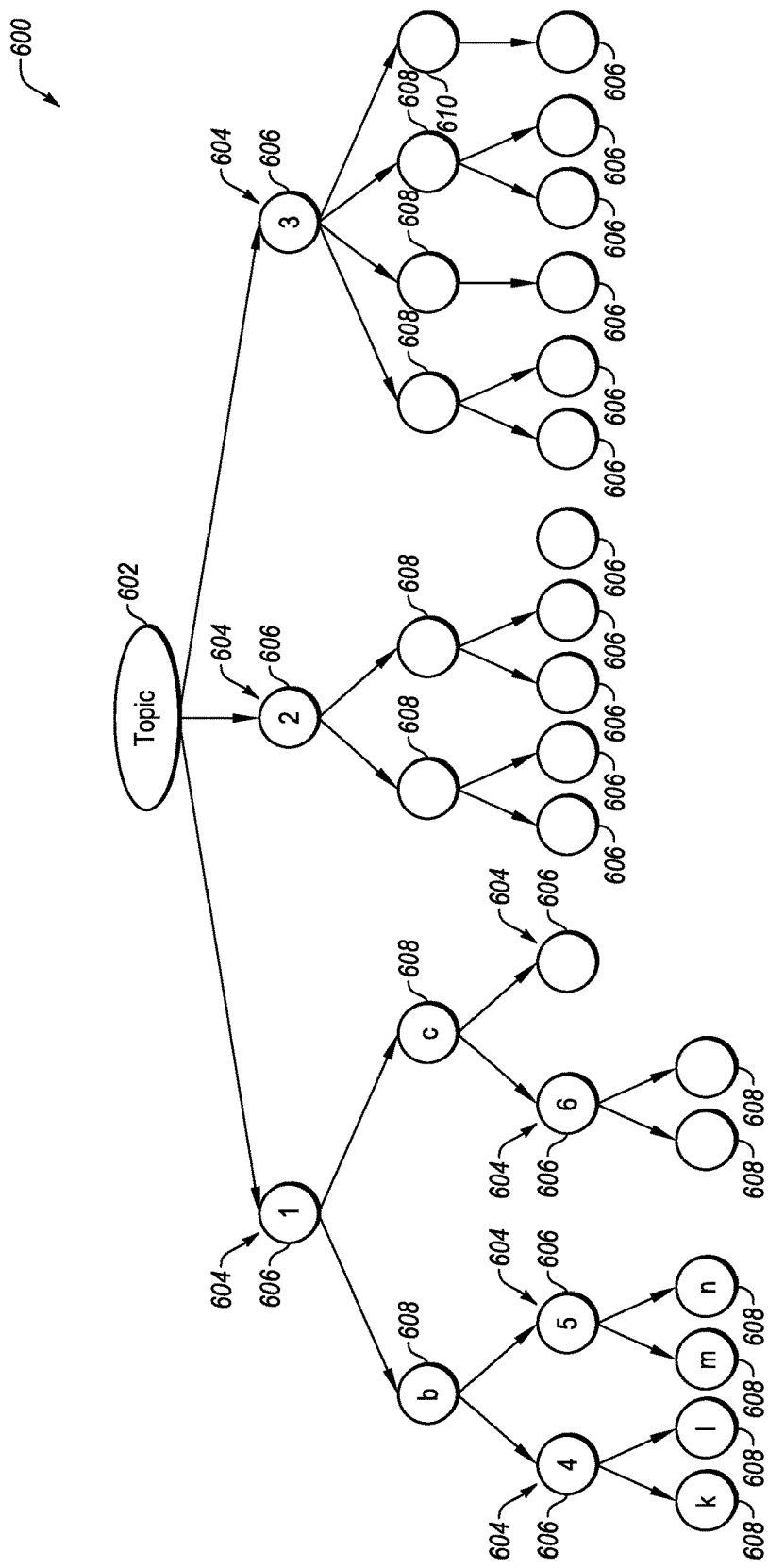
FIG. 6 illustrates an example conversation tree.

In some embodiments, at least a portion of a conversation tree (e.g., a seed tree) may be generated by a professional and/or a crowd, wherein target users of each conversation tree may be specified by the professional and/or the crowd. More specifically, with reference to a conversation tree 600 illustrated in FIG. 6, in one embodiment, a topic 602, which may be generated via topic generator module 504, may be selected. Further, advice generator module 506, using data from crowds and/or professionals, may generate finite trees (e.g., conversation tree 600) for a topic, wherein each tree may provide advice to a user. In addition to topic 602, conversation tree 600 includes advice conversations 604, advice statements 606, and user responses 608. In one embodiment, a professional and/or a crowd may identify a target user for a proposed conversation tree. Stated another way, the professional and/or the crowd may identify a type of user that would likely benefit from the advice provided in a conversation tree. According to one embodiment, if an amount of crowdsource data reaches a threshold amount, use of a human professional may be decreased and possibly phased out entirely.

Figure 7A:
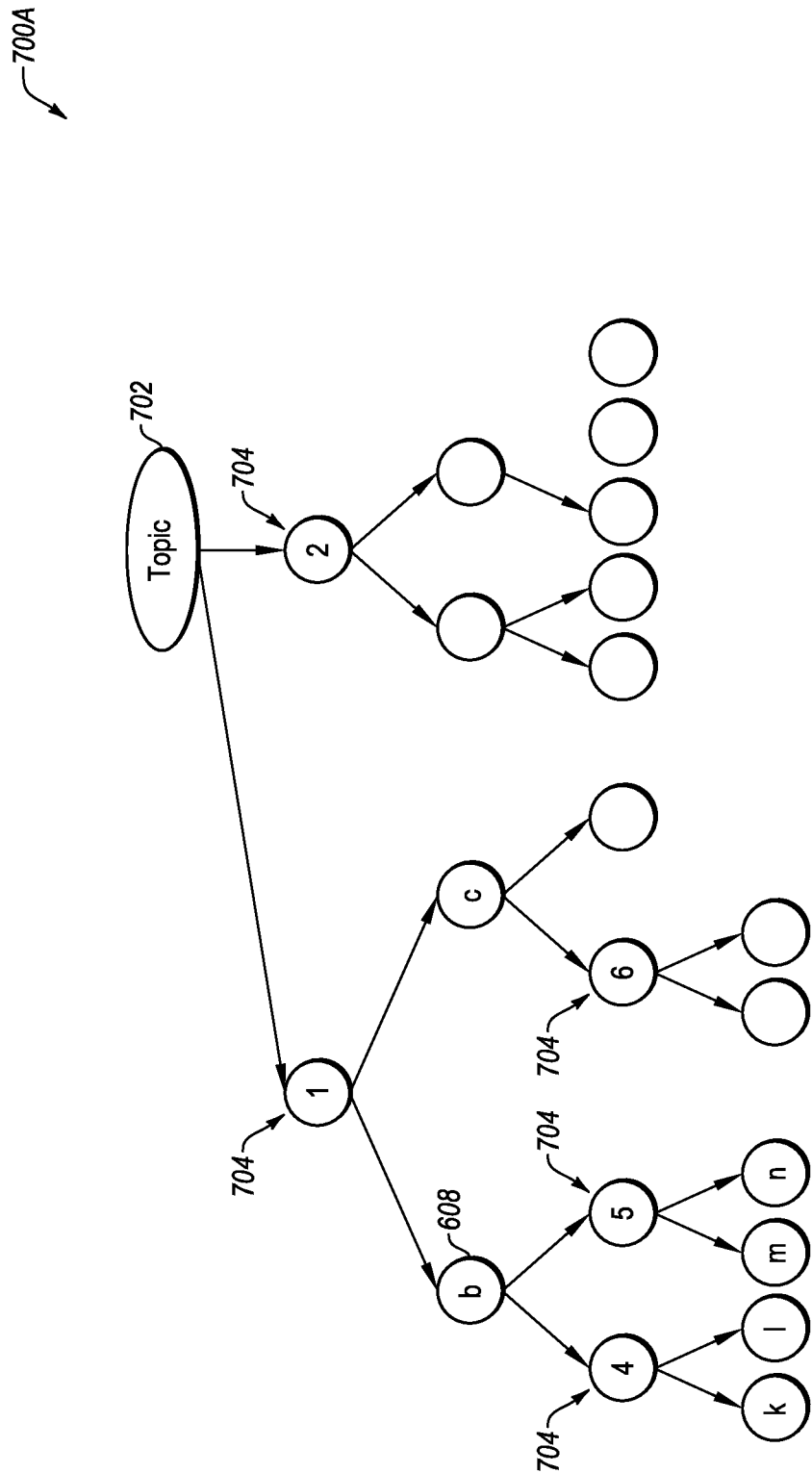
FIG. 7A depicts another example conversation tree.

Advice editing module 508 (FIG. 5) may be configured to assist in generating (e.g., growing) a conversation tree. After a user selects a topic, advice editing module 508 may present all advice conversations to a professional. For example, with reference to conversation tree 700A illustrated in FIG. 7A, advice conversations 704 for topic 702 may be presented to a professional via advice editing module 508.

Figure 7B:
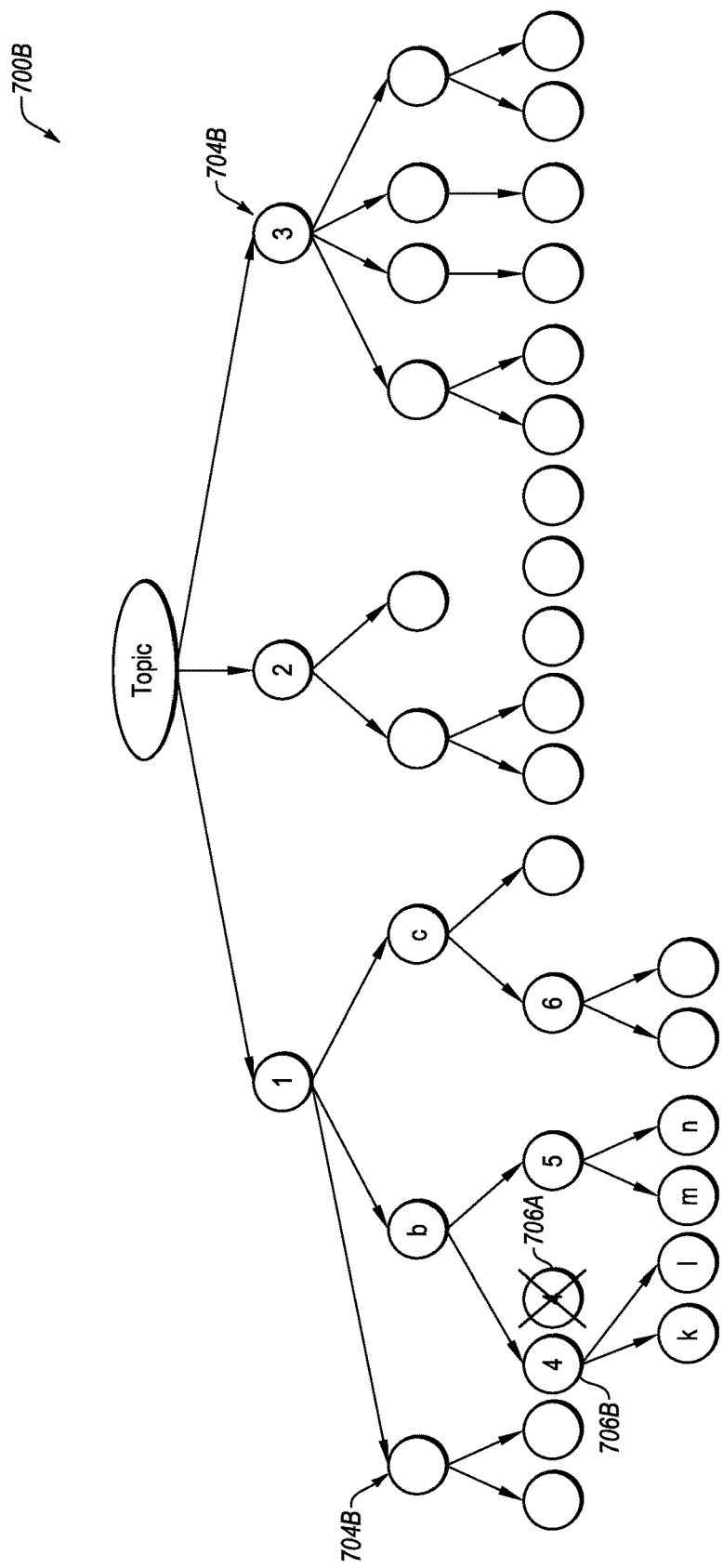
FIG. 7B depicts an edited example conversation tree.

Further, a professional may edit advice conversations, if necessary. One or more operations associated with editing an advice conversation may be performed via, for example, editing suggestion module 515 (FIG. 5). As illustrated in FIG. 7B, conversation tree 700B, which is an edited version of conversation tree 700A, includes edits made by a professional. More specifically, conversation tree 700B includes additional advice conversations 704B. In addition, an advice statement 706A has been replaced by advice statement 706B.

Figure 7C:
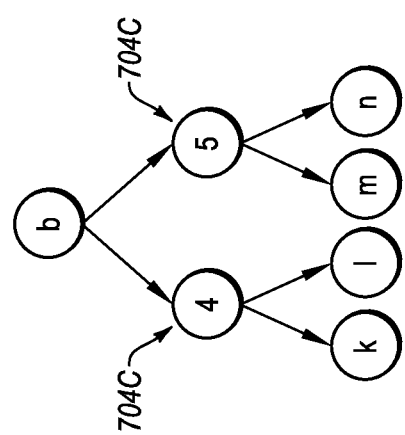
FIG. 7C depicts an example advice conversation.

It is noted that each time a user selects an answer (a response), an advice conversation may be presented to the user. For example, assuming a user selects node b, as depicted in FIG. 7B, advice conversations 704C, as illustrated in FIG. 7C, may be presented to the user.

It is further noted that if a set of advice conversations is not sufficiently limited (e.g., the set is too large), a professional may edits the conversation (e.g., offline). Further, in some embodiments, the edits may not be made in real-time. In this example, processing by advice editing module 508 (FIG. 5) may be offline.

As described herein, a user may provide a rating for each advice conversation that was provided to the user. According to various embodiments, a rating may be defined for each advice statement node. One or more operations associated with rating an advice conversation may be performed via rating module 510 (FIG. 5). In one embodiment, a rating for each advice statement may be an average of ratings of all advice conversations originating from that advice statement. It is noted that the term "advice statement" may also be referred to herein as an "advice node."

Figure 8A:
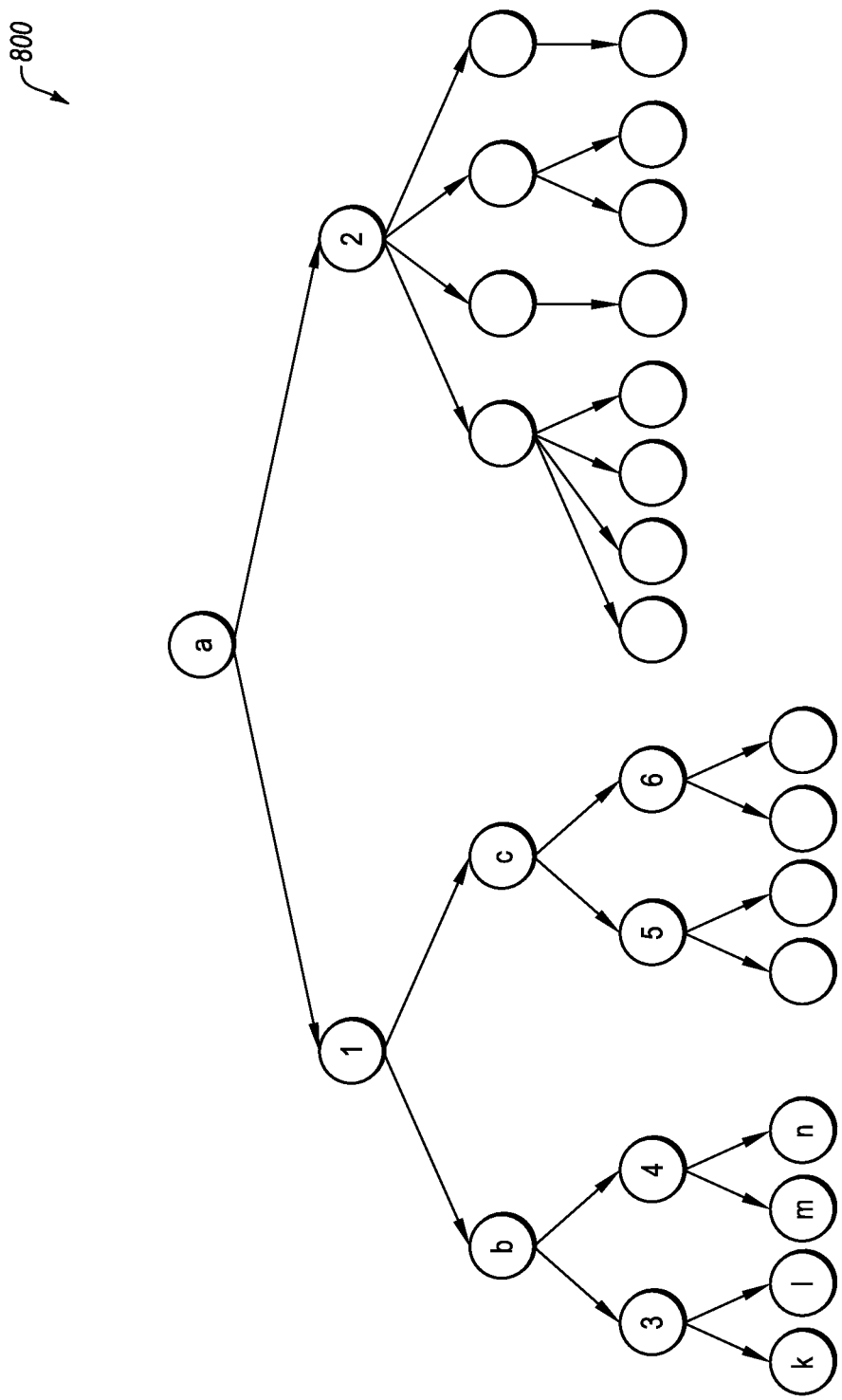
FIG. 8A illustrates an example conversation tree.

FIG. 8A depicts a conversation tree 800 including advice nodes 1-6, and user response nodes a, b, k, l, m, n, and o. As illustrated, advice node 1 includes eight (8) associated conversation paths: a path from node 1 to node K ($p_{(1,1)}$=(1,b,3,k)), a path from node 1 to node l ($p_{(1,2)}$=(1,b,3,l)), a path from node 1 to node m ($p_{(1,3)}$=(1,b,4,m)), a path from node 1 to node n ($p_{(1,4)}$=(1,b,4,n)), a path from node 1 to node o ($p_{(1,5)}$=(1,c,5,o)), and so on. It is noted that, for "$p_{(X,Y)}$", X represents the node number and Y represents the path number.

A rating $r_m$ for advice node 1 (advice statement 1) may be provided by the following equation:

$$r_m(1) = \text{sum}(r_{p(1,1)} + r_{p(1,2)} + r_{p(1,3)} + r_{p(1,4)} + r_{p(1,5)} + \cdots + r_{p(1,8)})/N_1; \quad (1)$$

wherein $N_1$ is the number of paths originated from node 1, which in this example, is eight (8).

As another example, for advice node 4 (advice statement 4), $p_{(4,1)}$=(4,m), $p_{(4,2)}$=(4,n), and a rating $r_m$ for advice node 4 may be provided by the following equation:

$$r_m(4) = \text{sum}(r_{p(4,1)} + r_{p(4,2)})/N_4; \quad (2)$$

wherein $N_4$ is the number of paths originated from node 4, which in this example, is two (2).

Rating $r_p$, which is the rating provided by a user for the associated advice conversation path, may be based on one or more factors. For example, rating $r_p$ may be an average rating of an effectiveness rating $r_1$ of the advice conversation path, an efficiency rating $r_2$ of the advice conversation path, and/or a user satisfaction rating $r_3$ of the advice conversation path.

Initially, rating $r_p$ may be set equal to a highest rating (e.g., 5), and after a user begins to rate the paths, rating $r_p$ may be adjusted to indicate an average of the user ratings. As noted above, a professional may edit one or more advice conversations of an advice tree, and thus rating for one or more advice nodes may change depending on the edits.

Figure 8B:
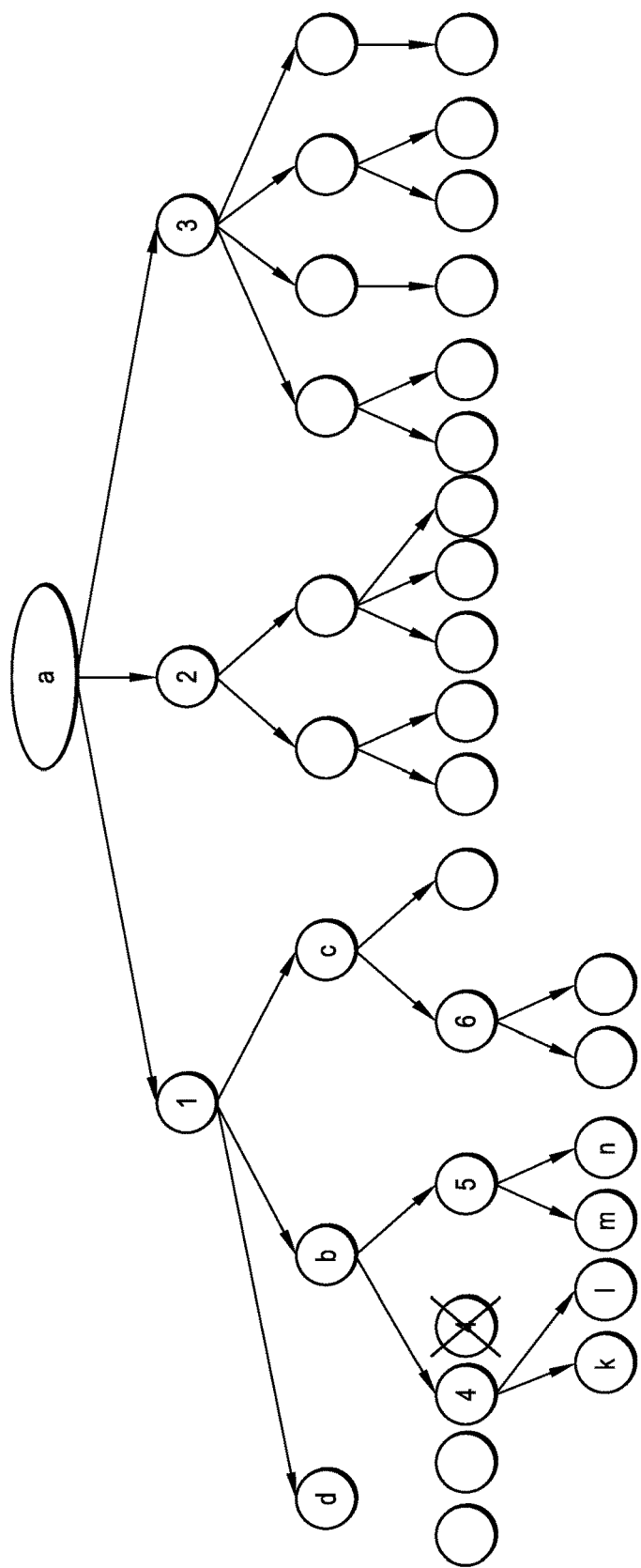
FIG. 8B illustrates an edited example conversation tree.

With reference to FIG. 8B, if a professional has added node 3 and node d, and has replaced node 4. Initially, all advice conversations originating from node 3 have the highest value (e.g., 5). A rating for advice node 3 ($r_m(3)$) is=ω*5, wherein ω a 1/S and S is the number of ratings associated to the paths that originated from nodes with the same parent (e.g., nodes 1 and 2 for node 3; nodes b and c for node d). The same process is repeated for nodes d. Based on the new rating, the rating for all parent advice nodes may change. According to various embodiments, a professional's effect on advice may be reduced depending on a number of reviews provided by users.

It is noted that an initial value of ω may be considered to be, for example, one. Further, a threshold value for S may exist, and upon reaching the threshold value, the value of ω may decrease depending on the value of S.

Figure 8C:
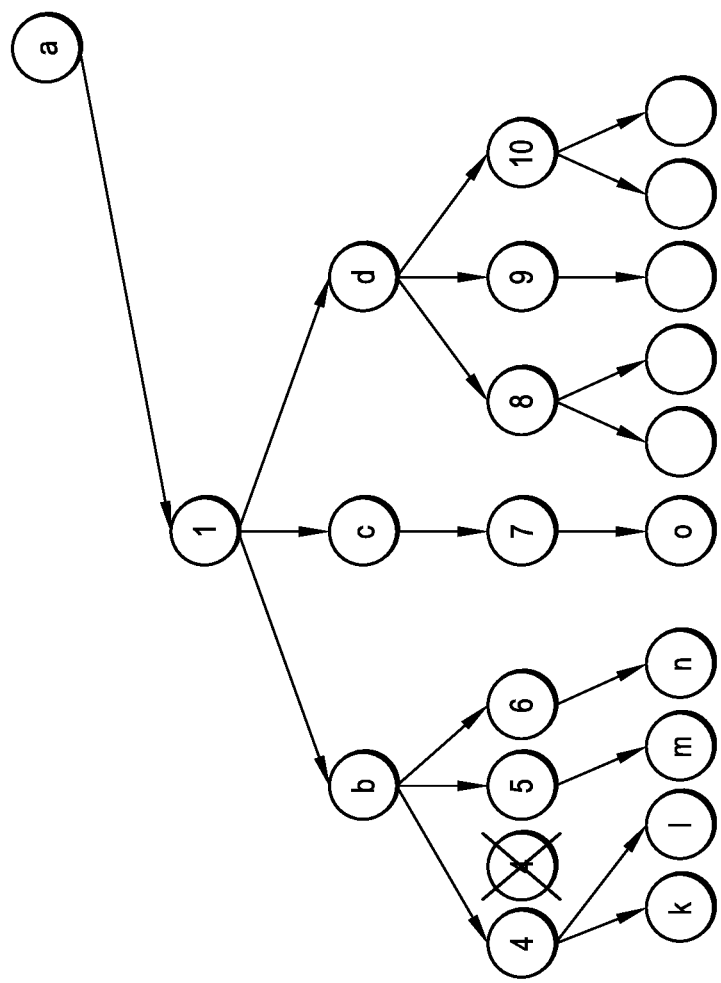
FIG. 8C illustrates an example conversation tree.

In one example, as illustrated in FIG. 8C, a professional has edited node 4. In this example, ratings for the advice conversations originating from node 4 may be multiplied by a value ρ where ρ>1, ρ α 1/S, and S is the number of reviews provided for paths originating from node 4. A threshold value for S may be considered, after which the value of ρ decreases depending on the value of S.

Figure 9:
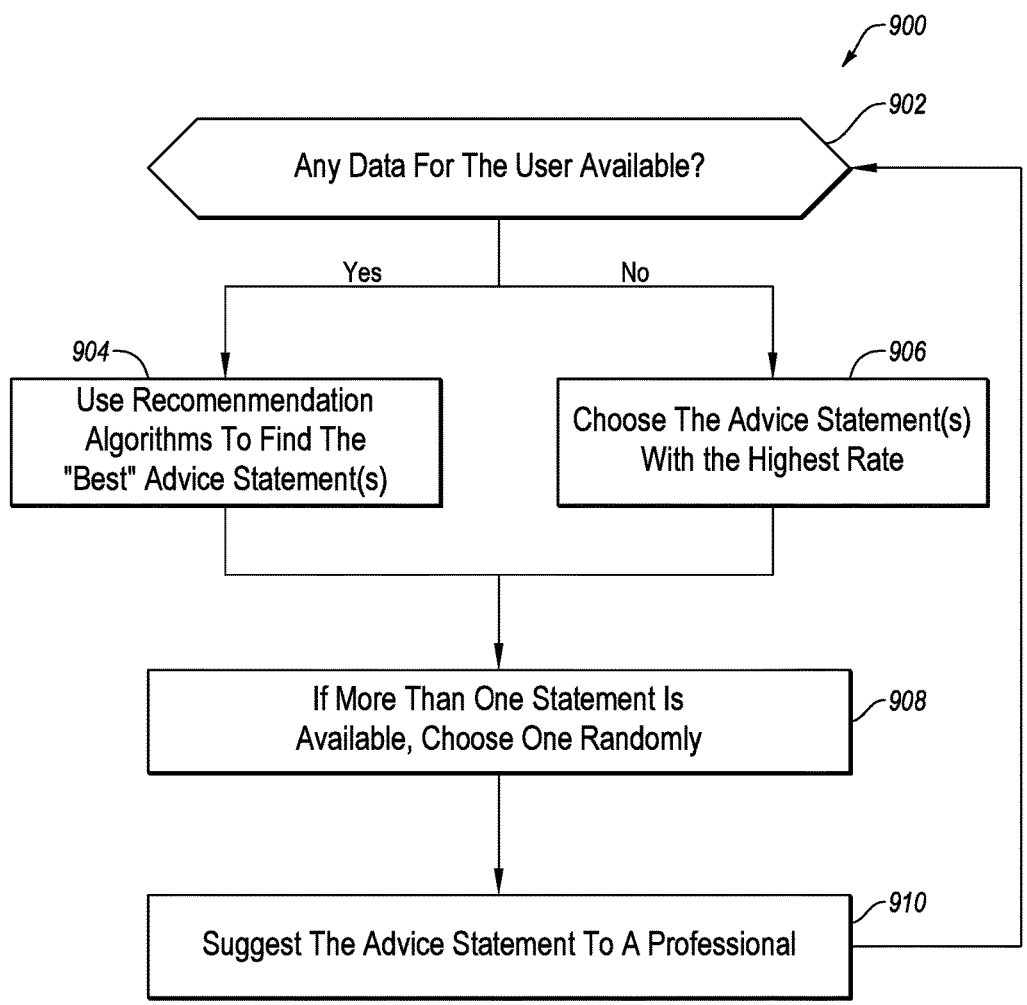
FIG. 9 is a flowchart of an example method of selecting an advice statement.

FIG. 9 is a flowchart of an example method 900 for suggesting an advice statement, in accordance with at least one embodiment of the present disclosure. Method 900 may be performed by any suitable system, apparatus, or device. For example, advice engine 102 of FIG. 1 or one or more of the components thereof (e.g., advice suggestion module 512 of FIG. 5) may perform one or more of the operations associated with method 900. In these and other embodiments, program instructions stored on a computer readable medium may be executed to perform one or more of the operations of method 900.

At block 902, a determination may be made as to whether any user data is available. If it is determined that user data is available, method 900 may proceed to block 904. If it is determined that user data is not available, method 900 may proceed to block 906.

At block 904, one or more recommendation algorithms to determine one or more optimal advice statements may be selected, and method 900 may proceed to block 908. For example, collaborative filtering may be used to identify similar users, and recommendations may be based on preferences of similar users.

At block 906, one or more advice statements having the highest rating may be selected, and method 900 may proceed to block 908. At block 908, if more than one advice statements is available, one advice statements may be randomly selected, and method 900 may proceed to block 910. At block 910, the selected advice statements may presented to a professional (e.g., professional 104 of FIG. 1), and method 900 may return to block 902.

Modifications, additions, or omissions may be made to method 900 without departing from the scope of the present disclosure. For example, the operations of method 900 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments.

Figure 10:
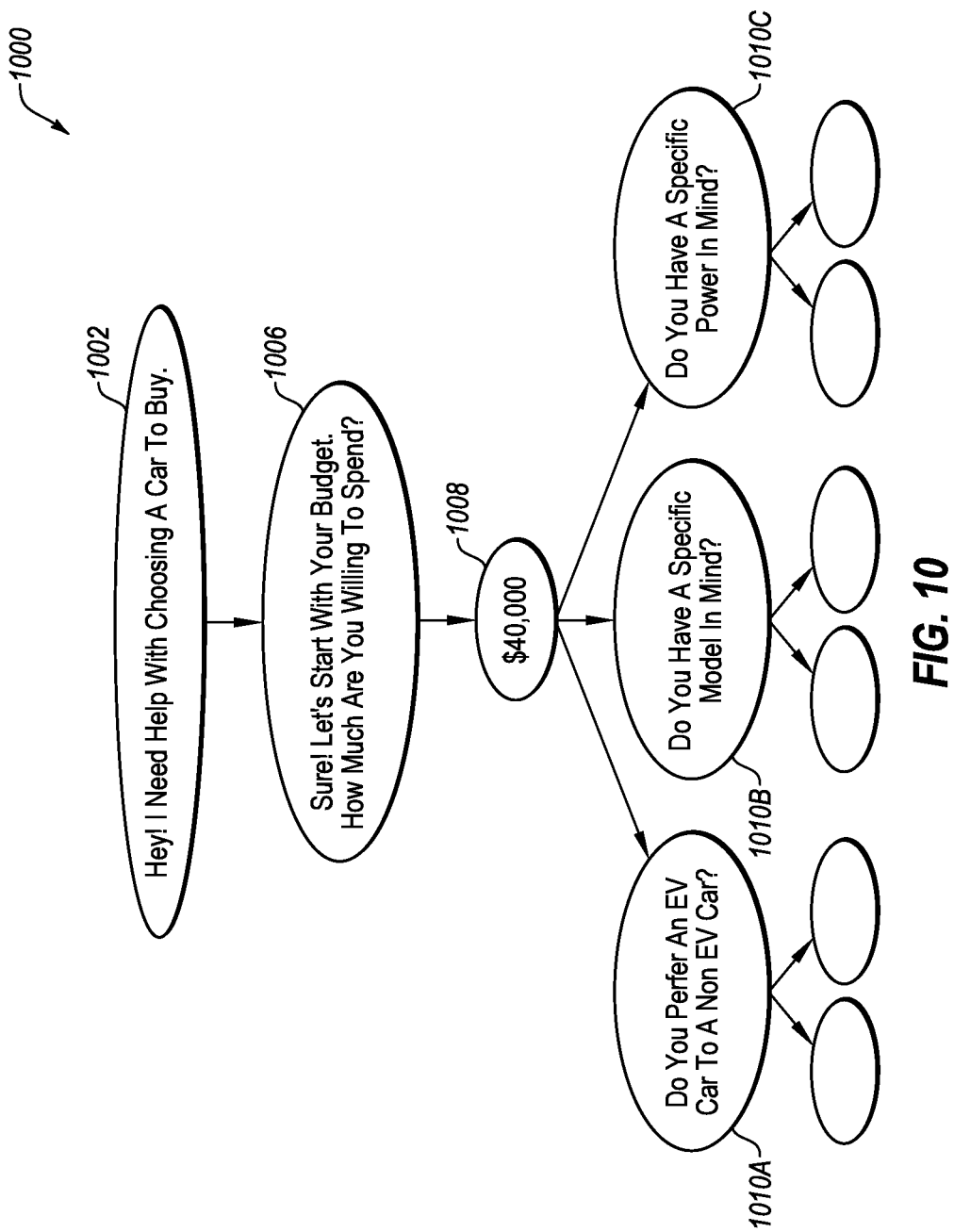
FIG. 10 depicts yet another example conversation tree.

FIG. 10 illustrates another example advice conversation tree 1000 including a topic 1002 of "Hey! I need help with choosing a car to buy". Advice conversation tree 400 further includes an advice statement 1006, which is presented to a user. Further, the user provides a response 1008.

Based on the response by the user, additional advice statements 1010A, 1010B, and 1010C may be considered. In one example, although the advice node associated with advice statement 1010A has the highest rating, an advice engine (e.g., specifically advice suggestion module 512 of FIG. 5) may suggest another advice node (e.g., the advice node associated with advice statement 1010B based on the data previously collected from the user. More specifically, for example, previously received data (e.g., received at the advice engine) concerning the user may indicate that the user does not live in a city, and, therefore, advice statement 1010A is likely not the best advice statement to be provided to the user.

According to one embodiment, advice engine 102 (see FIG. 1) may be configured to review ratings of one or more advice nodes. In one embodiment, if the rating of an advice node is, for example, below average, or has not improved despite an increase in a number of ratings, advice engine 102, and more specifically, editing suggestion module 514 may suggest that professional 102 review, and possibly edit the advice node.

FIG. 11 is a block diagram of an example computing device 1100, in accordance with at least one embodiment of the present disclosure. For example, advice engine 102 of FIG. 1 may be implemented as computing device 1100. Computing device 1100 may include a desktop computer, a laptop computer, a server computer, a tablet computer, a mobile phone, a smartphone, a personal digital assistant (PDA), an e-reader device, a network switch, a network router, a network hub, other networking devices, or other suitable computing device.

Computing device 1100 may include a processor 1110, a storage device 1120, a memory 1130, and a communication device 1140. Processor 1110, storage device 1120, memory 1130, and/or communication device 1140 may all be communicatively coupled such that each of the components may communicate with the other components. Computing device 1100 may perform any of the operations described in the present disclosure.

In general, processor 1110 may include any suitable special-purpose or general-purpose computer, computing entity, or processing device including various computer hardware or software modules and may be configured to execute instructions stored on any applicable computer-readable storage media. For example, processor 1110 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 11, processor 1110 may include any number of processors configured to perform, individually or collectively, any number of operations described in the present disclosure.

In some embodiments, processor 1110 may interpret and/or execute program instructions and/or process data stored in storage device 1120, memory 1130, or storage device 1120 and memory 1130. In some embodiments, processor 1110 may fetch program instructions from storage device 1120 and load the program instructions in memory 1130. After the program instructions are loaded into memory 1130, processor 1110 may execute the program instructions.

For example, in some embodiments one or more of the processing operations of an advice engine may be included in data storage 1120 as program instructions. Processor 1110 may fetch the program instructions of one or more of the processing operations and may load the program instructions of the processing operations in memory 1130. After the program instructions of the processing operations are loaded into memory 1130, processor 1110 may execute the program instructions such that computing device 1100 may implement the operations associated with the processing operations as directed by the program instructions.

Storage device 1120 and memory 1130 may include computer-readable storage media for carrying or having computer-executable instructions or data structures stored thereon. Such computer-readable storage media may include any available media that may be accessed by a general-purpose or special-purpose computer, such as processor 1110. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 1110 to perform a certain operation or group of operations.

In some embodiments, storage device 1120 and/or memory 1130 may store data associated with an advice engine. For example, storage device 1120 and/or memory 1130 may store user data, topic data, advice conversation sets, crowdsourced data, and/or ratings data.

Communication device 1140 may include any device, system, component, or collection of components configured to allow or facilitate communication between computing device 1100 and another electronic device. For example, communication device 1140 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. Communication device 1140 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 11 without departing from the scope of the present disclosure. For example, computing device 1100 may include more or fewer elements than those illustrated and described in the present disclosure. For example, computing device 1100 may include an integrated display device such as a screen of a tablet or mobile phone or may include an external monitor, a projector, a television, or other suitable display device that may be separate from and communicatively coupled to computing device 1100.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method of providing advice to a user, comprising:
   receiving a topic from the user;
   storing data related to the topic at a server;
   retrieving, from the server, one or more potential advice conversations based on the topic provided by the user wherein each potential advice conversation of the one or more potential advice conversations includes one or more advice statements;
   selecting an advice statement from the one or more advice statements based on a first rating of the selected advice statement being higher than a second rating of another advice statement of the one or more advice statements, wherein the selected advice statement includes one or more paths originating therefrom, each of the one or more paths includes advice, the first rating of the selected advice statement is based on a path rating of each path of the one or more paths, and the path rating of each path of the one or more paths is based on an effectiveness rating of the advice included in the corresponding path, an efficiency rating of the corresponding path, and a user satisfaction rating of the corresponding path; and
   presenting the selected advice statement to the user upon receiving real-time approval of the selected advice statement from a human professional.

2. The method of claim 1, further comprising receiving and storing user data provided by the user, wherein the selecting of the selected advice statement is further based on the user data.

3. The method of claim 1, further comprising:
   dynamically editing at least one potential advice conversation of the one or more potential advice conversations based on feedback from the human professional;
   setting a rating of one or more advice statements of the edited potential advice conversation to a highest possible rating; and
   resetting a feedback counter of one or more advice statements of the edited potential advice conversation.

4. The method of claim 1, further comprising updating the first rating of the selected advice statement based on feedback from the user.

5. The method of claim 1, further comprising updating the first rating of the selected advice statement based on at least one of: feedback from one or more other users and at least one edit of the one or more potential advice conversations based on feedback from the human professional.

6. The method of claim 1, further comprising editing another advice statement of the one or more advice statements based on a rating of the edited advice statement being lower than the second rating of the other advice statement.

7. The method of claim 1, wherein the first rating of the selected advice statement is calculated according to the following equation:

$$r_m(X) = \text{sum}(r_{p(X,A)} + r_{p(X,B)} + r_{p(X,C)} + r_{p(X,D)} + r_{p(X,E)} + \cdots + r_{p(X,N)})/N_1;$$

wherein $r_m$ represents the first rating, X represents the selected advice statement, $r_p$ represents a path rating, A, B, C, D, E . . . N each represent a path originating from the selected advice statement, and $N_x$ is the number of paths originating from the selected advice statement.

8. The method of claim 1, wherein the path rating of each path of the one or more paths is calculated according to the following equation:

$$r_p(X,K) = r_1 + r_2 + r_3;$$

wherein $r_p$ represents a path rating, X represents the selected advice statement, K represents a corresponding path originating from the selected advice statement, $r_1$ represents an effectiveness rating of advice provided by the corresponding path, $r_2$ represents the efficiency rating of the corresponding path, and $r_3$ represents the user satisfaction rating of the corresponding path.

9. The method of claim 1, wherein selecting an advice statement from the one or more advice statements is based on the first rating of the selected advice statement being higher than a rating of each of the other advice statements.

10. The method of claim 1, further comprising selecting another, different advice statement from the one or more advice statements upon not receiving approval of the selected advice statement from the human professional.

11. One or more non-transitory computer-readable media that include instructions that, when executed by one or more processors, are configured to cause the one or more processors to perform operations, the operations comprising:
   receiving a topic from a user;
   storing data related to the topic at a server;
   retrieving, from the server, one or more potential advice conversations based on the topic provided by the user wherein each potential advice conversation of the one or more potential advice conversations includes one or more advice statements;
   selecting an advice statement from the one or more advice statements based on a first rating of the selected advice statement being higher than a second rating of another advice statement of the one or more advice statements, wherein the selected advice statement includes one or more paths originating therefrom, each of the one or more paths including advice, the first rating of the selected advice statement is based on a path rating of each path of the one or more paths, and the path rating of each path of the one or more paths is based on one or more of an effectiveness rating of the advice included in the corresponding path, an efficiency rating of the corresponding path, and a user satisfaction rating of the corresponding path; and
   presenting the selected advice statement to the user upon receiving real-time approval of the selected advice statement from a human professional.

12. The computer-readable media of claim 11, the operations further comprising:
   dynamically editing at least one potential advice conversation of the one or more potential advice conversations based on feedback from the human professional;
   setting a rating of one or more advice statements of the edited potential advice conversation to a highest possible rating; and
   resetting a feedback counter of one or more advice statements of the edited potential advice conversation.

13. The computer-readable media of claim 11, further comprising updating the first rating of the selected advice statement based on feedback from the user.

14. The computer-readable media of claim 13, wherein the first rating assigned to the selected advice statement is based on a sum of ratings for each path originating from the selected advice statement.

15. The computer-readable media of claim 11, wherein selecting the selected advice statement from the one or more advice statements is based on the first rating of the selected advice statement exceeding a rating of each of the one or more advice statements.

16. The computer-readable media of claim 11, the operations further comprising selecting another, different advice statement from the one or more advice statements in response to the human professional not approving the selected advice statement.

17. A system of providing advice to a user, comprising:
one or more processors configured to:
receive a topic from the user;
store data related to the topic at a server;
retrieve, from the server, one or more potential advice conversations based on the topic provided by the user wherein each potential advice conversation of the one or more potential advice conversations includes one or more advice statements;
select an advice statement from the one or more advice statements based on a first rating of the selected advice statement being higher than a second rating of another advice statement of the one or more advice statements, wherein the selected advice statement includes one or more paths originating therefrom, each of the one or more paths includes advice, the first rating of the selected advice statement is based on a path rating of each path of the one or more paths, and the path rating of each path of the one or more paths is based on an effectiveness rating of the advice included in the path, an efficiency rating of the path, and a user satisfaction rating of the path; and
present the selected advice statement to the user upon receiving real-time approval of the selected advice statement from a human professional.

18. The system of claim 17, the one or more processors further configured to:
receive user data from the user; and
select the selected advice statement based on the user data.

19. The system of claim 17, the one or more processors further configured to:
dynamically edit at least one potential advice conversation of the one or more potential advice conversations based on feedback from the human professional;
set a rating of one or more advice statements of the edited potential advice conversation to a highest possible rating; and
reset a feedback counter of one or more advice statements of the edited potential advice conversation.

20. The system of claim 17, the one or more processors further configured to update the first rating of the selected advice statement based on feedback from the user.

* * * * *